United States Patent [19]

Nogami et al.

[11] Patent Number: 5,014,748
[45] Date of Patent: May 14, 1991

[54] ROTARY VALVE

[75] Inventors: Tadahiko Nogami, Mito; Ichiro Nakamura, Katsuta; Ichiro Maeno; Ryohei Kinose, both of Hitachi, all of Japan

[73] Assignee: Hitachi, Ltd., Tokyo, Japan

[21] Appl. No.: 302,816

[22] Filed: Jan. 18, 1989

[30] Foreign Application Priority Data

Jan. 18, 1988 [JP] Japan .................................. 63-6868

[51] Int. Cl.⁵ .......................................... F15B 13/044
[52] U.S. Cl. .......................... 137/625.65; 137/625.21; 251/129.11; 251/283
[58] Field of Search ...................... 137/625.21, 625.65; 251/129.11, 283

[56] References Cited

U.S. PATENT DOCUMENTS

| | | | |
|---|---|---|---|
| 2,989,080 | 6/1961 | Dillberg | 137/625.65 |
| 3,023,779 | 3/1962 | Cinnirella | 137/625.65 |
| 3,090,400 | 5/1963 | Broome | 137/625.65 |
| 3,835,888 | 9/1974 | Leutner et al. | 137/625.64 |
| 4,735,233 | 4/1988 | Nogami et al. | 137/625.65 |

FOREIGN PATENT DOCUMENTS

| | | | |
|---|---|---|---|
| 153073 | 7/1986 | Japan . | |
| 468021 | 5/1975 | U.S.S.R. | 137/625.24 |
| 907226 | 10/1962 | United Kingdom | 137/625.21 |
| 2104249 | 3/1983 | United Kingdom | 137/625.65 |

OTHER PUBLICATIONS

PCT Publication No. WO 82/03436 Published 14 Oct. 1982.

Primary Examiner—Gerald A. Michalsky
Attorney, Agent, or Firm—Antonelli, Terry, Stout & Kraus

[57] ABSTRACT

A rotary valve has a valve body having at least one cylindrical hole, and casings provided with sleeves/plugs having an outer diameter substantially equal to an inner diameter of the cylindrical hole. The sleeves/plugs are provided in coaxial relation with the cylindrical hole. A flow of fluid is controlled by the relative motion between the valve body and the casings. The rotary valve may be provided with a high response time even by a small drive force.

3 Claims, 20 Drawing Sheets

ROTARY VALVE

BACKGROUND OF THE INVENTION

The present invention relates to a rotary valve used as a direct drive type rotary servo valve and for a hydraulic pressure control unit of a rolling machine and a method of making such rotary valve.

A conventional rotary valve of the aforementioned is described in, for example, Japenese Patent Unexamined Publication No. 61-153073, wherein axially extending grooves are formed in an outer surface of a cylindrical valve body and in an inner surface of a casing for receiving the valve body, with a valve portion for forming control orifices with edges of side surfaces of the inner and outer grooves, and with a disc-shaped rotator integrally coupled to the end portion of the valve body to drive the valve body and to change an opening area of the control orifices.

Also, as described in that publication, sleeves are provided in parallel with a rotary center axis of the valve body, and flow paths are spaced from each other by the sleeves and are formed on both sides of the valve body. On the other hand, cylindrical holes having an inner diameter substantially equal to an outer diameter of the sleeves are formed coaxially with the sleeves in the casing. A disc-shaped rotator is integrally coupled to a part of the valve body to drive the valve body. The relative motion between the sleeves and the cylindrical holes causes a charge in the opening area of the control orifices, formed by the outer edges of the sleeve, the inner edges of the cylindrical holes and the inner and outer edges of the flow paths.

In the above-described prior art, it would be difficult or impossible to ensure a high manufacture precision since the inner diameter portions of the casings require an intricate manufacture. This makes it impossible to ensure a high precision in control. Also, it would be difficult to reuse the valve portion in the case where edges of the control orifices are worn due to the use for a long period.

On the other hand, if the flow paths are formed in the valve body, there is a problem that the size of the valve body would be enlarged in order to increase the cross-sectional area of the flow paths to ensure satisfactory flow rate control characteristics. Also, since the sleeves are provided in the valve body, it is necessary to provide partition walls and outer walls having mechanical strength enough to suppress any deformation of the valve body in high pressure parts. In addition, since the structure of the valve body is intricate, a stress concentration would be likely to be generated particularly in connection parts between the partition walls and the outer walls. In order to avoid this defect, it is necessary to provide additional reinforcements. As a result, the valve body would be enlarged in size to increase inertia moments, and it would be impossible to ensure a high response time.

Also, as described above, if the inertia moments of the valve body would be increased, the drive, force is required to obtain a desirable response time would increase. It is, therefore, necessary to enlarge the rotator to increase the output of the drive portion and as a result, since the inertia moments of the rotator per se would be increased, it is further difficult to ensure a higher response time.

In general since the sleeves for defining the control orifices in cooperation with a spool and receiving the spool require an intricate and precise manufacture, it is difficult to manufacture the sleeves. In particular, there is a problem that a high technique and a number of manufacturing steps are needed to ensure the positional relationship of the edges for determining the lap amount. Also, after a long service, if the edges of the control orifices would be worn, it is difficult to again use the worn valve portion with additional machining for reuse.

SUMMARY OF THE INVENTION

An object of the present invention is to provide a rotary valve and method of manufacturing the same which ensure a high response time with a small drive force with a high precision in control, may be made small in size and lightweight, and may readily be reused in its valve portion and to provide a hydraulic control apparatus for a rolling machine which uses the rotary valve.

In order to attain the above and other objects, a rotary valve according to the present invention comprises casings and a valve body rotatably provided within the casings, in which a relative motion between the valve body and the casings causes the flow of fluid to be controlled. The valve body has cylindrical holes, and the casings have sleeves or plugs having an outer diameter substantially equal to an inner diameter of the cylindrical holes.

In a hydraulic pressure control apparatus for a rolling machine according to the present invention, having a hydraulic cylinder, a servo valve for controlling motion of the hydraulic cylinder, a hydraulic power unit for supplying a high pressure oil to the servo valve, and a controller for generating a control command signal to the servo valve, the servo valve comprises a valve body having cylindrical holes, a drive means having a rotator integrally coupled to a part of the valve body, and casings having sleeves or plugs, having an outer diameter substantially equal to an inner diameter of the cylindrical holes of the valve body, in coaxial relation with the cylindrical holes of the valve body, for rotatably supporting the valve body.

DESCRIPTION OF THE PREFERRED EMBODIMENTS

Figure 1:
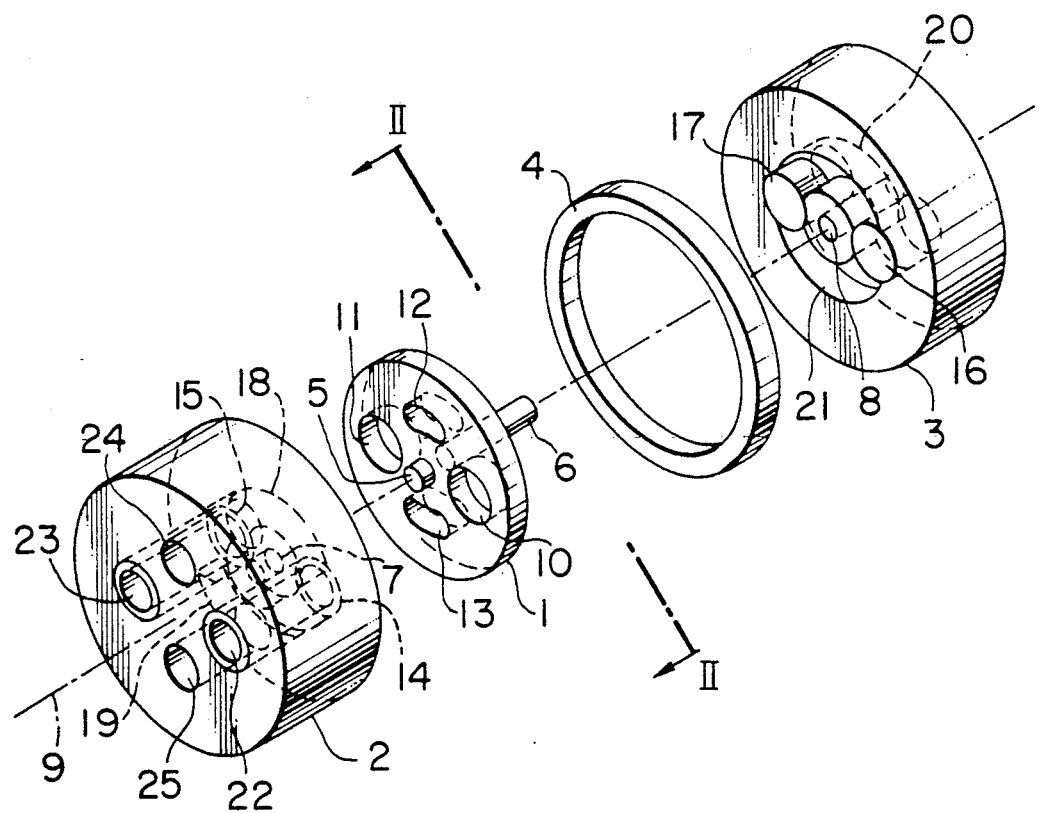
FIG. 1 is an exploded perspective view showing a four-way rotary valve in accordance with one embodiment of the invention.

Referring now to the drawings wherein like reference numerals are used throughout the various views to designate like parts and, more particularly, to FIG. 1, according to this figure, a four-way valve includes a valve body 1 and a spacer 4 clamped by casings 2 and 3, with a thickness of the spacer 4 being slightly larger than an axial thickness of the valve body 1 by a predetermined amount. Shafts 5 and 6 extend from end faces of the valve body 1 to form radial bearings in cooperation with axial holes 7 and 8 formed in the casings 2 and 3, respectively. Therefore, the valve body 1 is rotatably supported about a rotary center axis 9 relative to the casings 2 and 3 and the spacer 4.

In the valve body 1, there are formed cylindrical holes 10 and 11 in parallel with the rotary center axis 9 and through hole portions 12 and 13. On the other hand, in the casings 2 and 3, there are formed sleeves 14 and 15 and plugs 16 and 17 having an outer diameter substantially equal to an inner diameter of the cylindrical holes 10 and 11 of the valve body 1, and there are so formed flow paths 18 and 19, and 20 and 21 which are separated from each other by the sleeves 14 and 15 and the plugs 16 and 17, respectively. In the casing 2, control ports 22 and 23 are connected to inner portions of the sleeves 14 and 15, a supply port 24 is connected to the flow path 18, and discharge port 25 is connected to the flow path 19. Also, the flow paths 18 and 20 are in communication with each other through hole portion 12, and the flow paths 19 and 21 are in communication with each other through hole portion 13.

Figure 2:
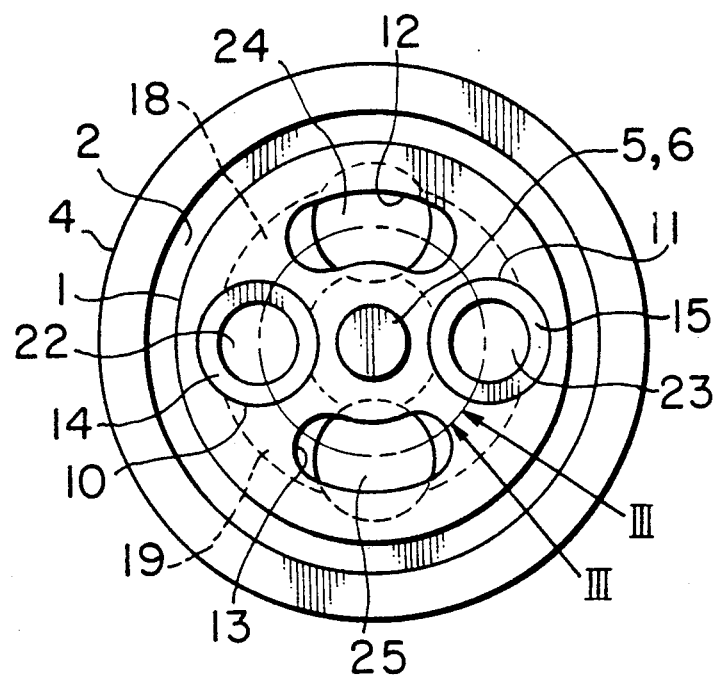
FIG. 2 is a view, as viewed from the position II—II of FIG. 1, showing a neutral position.
Figure 3:
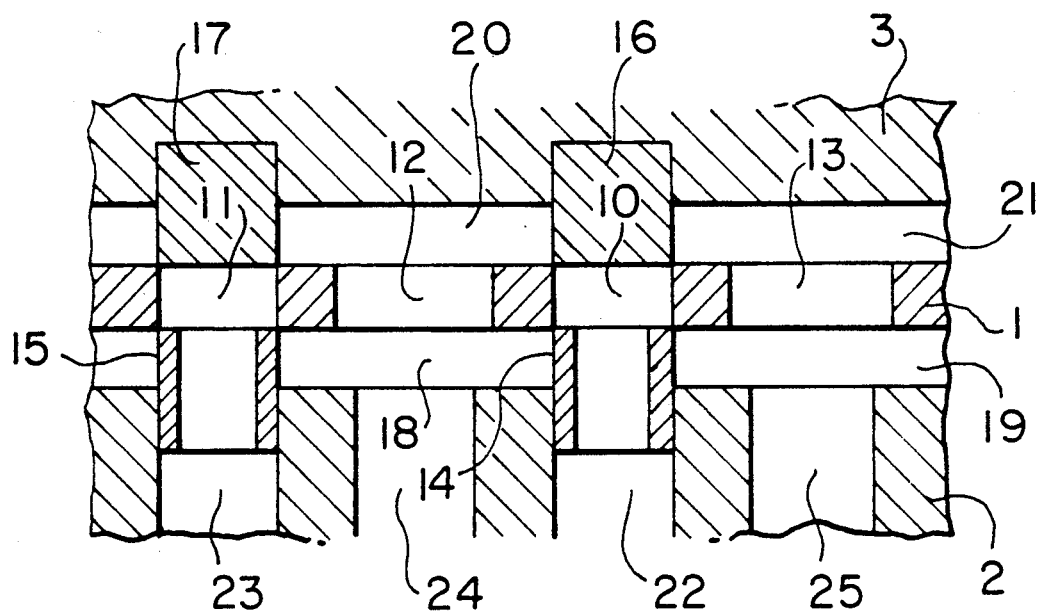
FIG. 3 is a developed sectional view along with the line III—III of FIG. 2.

In the neutral condition of FIGS. 2 and 3 wherein the valve is closed to interrupt the flow of the fluid, since the inner edges of the cylindrical holes 10 and 11 are aligned with the outer edges of the sleeves 14 and 15 and the plugs 16 and 17, respectively, the control ports 22 and 23 are partitioned by the supply port 24 and the discharge port 25, to interrupt the flow of fluid.

Figure 4:
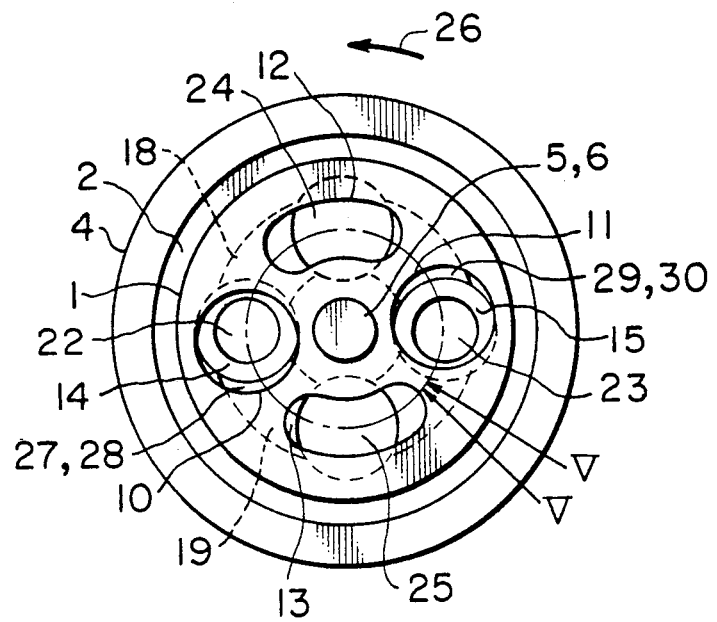
FIG. 4 is a view, as viewed from the position II—II of FIG. 1, showing an opening condition.
Figure 5:
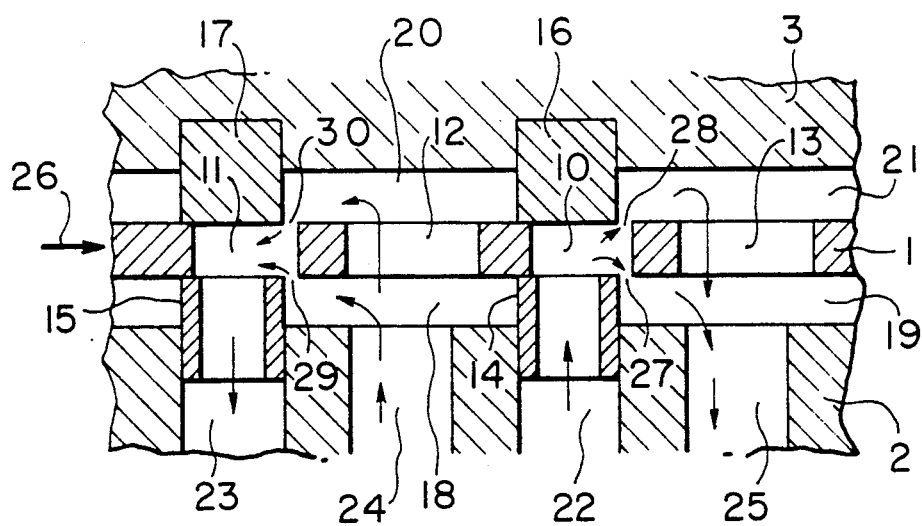
FIG. 5 is a developed sectional view along with the line V—V of FIG. 4.

If the valve body 1 is rotated in the direction indicated by the arrow 26 as shown in FIGS. 4 and 5, opening areas 27, 28 and 29, 30 defined by the inner edges of the cylindrical holes 10, 11 and the outer edges of the plugs 16, 17 and the inner and outer edges of the flow paths 18, 19 and 20, 21 are formed on both sides of the valve body 1, with the opening areas 27, 28, and 29, 30 serving as control orifices. Therefore, the control port 22 is communicated to the discharge port 25 through the control orifices 27 and 28, whereas the control port 23 is communicated to the supply port 24 through the control orifices 29 and 30, so that the fluid will flow from the supply port 24 to the control port 23 and from the control port 22 to the discharge port 25 as indicated by the arrows in FIG. 5. Also, if the valve body 1 is rotated in the direction opposite to the direction indicated by the arrow 26, the control port 22 is in communication with the supply port 24 and the control port 23 is in communication with the discharge port 25, so that the fluid will flow reversely from the supply port 24 to the control port 22 and from the control port 23 to the discharge port 25. The opening areas of the control orifices 27, 28 are in proportion to an angular shift of the valve body 1. Since the flow rate depends upon the opening areas, 27, 28 and 29, 30 the valve serves as a forward and reverse rotational type stepless, continuous variable four-way valve.

As the angular shift of the valve body 1 is increased, the opening areas of the control orifices 27, 28 are increased to increase the flow rate. In accordance with the increased flow rate, the flow velocity of the fluid flowing through the flow paths 18, 19, and 20, 21 is increased, so that the velocity will gradually approach the flow velocity through the control orifices. As a result, a pressure loss through the flow paths 18, 19, and 20, 21 is increased, so that the pressure difference between the portions downstream and upstream of the control orifices 27, 28 is decreased. Gradually, it is impossible to sufficiently enjoy the flow rate control effect of the control orifice 27, 28. Thus, the flow rate control characteristics of the valve is not in the linear relation. In order to avoid this, it is, therefore, necessary to increase the cross-sectional area of the flow paths 18, 19 and 20, 21 in comparison with the opening area of the control orifices 27, 28.

In the rotary valve in accordance with the above-described embodiment, in order to meet this requirement without enlargement of the valve body 1 and hence any increase of the inertial moment concomitant therewith, the sleeves 14, 15, the plugs 16, 17 and flow paths 18, 19 and 20, 21 are formed on the casing side so that the magnitude of cross-sectional area of the flow paths 18, 19 and 20, 21 would not directly affect the size of the valve body 1. Also, since the structure of the valve body is simple and any stress concentration or deformation would not be likely to be generated, it is unnecessary to impart an excess dimension to the valve body 1 for the reason of the mechanical strength. The valve body 1 may be made compact in, size and light in weight. Accordingly, since the inertial moment of the valve body 1 may be reduced, it is possible to ensure a high response time even with a small drive force. Furthermore, since, the high pressure parts extending from the supply port 24 and terminating at the control port 23 may be reduced to a minimum possible level, the valve portion as a whole may be made small in size and light in weight.

Also, since the flow paths 18, 19 and 20, 21 are formed in the casing side, it is possible to sufficiently increase the cross-sectional area of the flow paths without any adverse effect against the size of the valve body 1 as described above, and a pressure loss within the valve may be reduced. In addition, since the mass of fluid moving together with the rotation of the valve body 1 is small, it is possible to reduce the drive force correspondingly thereby insuring a hydrodynamic advantage.

Further, according to the above-described embodiment, upon manufacturing the valve portion, it is sufficient to simultaneously machine the cylindrical holes 10, 11, and the holes of the casings 2 and 3 on which the sleeves 14, 15 and the plugs 16 and 17 are to be mounted, respectively, and then to mount the sleeves 14, 15 and the plugs 16, 17 on the valve body 1. Also, the adjustment of the lap amount may be performed during the machining operation by adjusting the inner diameter of the cylindrical holes 10, 11 and the outer diameter of the plugs 16, 17 to a predetermined dimensional difference. Also, the adjustment of the clearance may be performed by adjusting a thickness difference between the valve body 1 and the spacer 4. Accordingly, the manufacturing method of the valve portion may be facilitated and the number of manufacturing steps may be reduced. In addition, it is possible to ensure the high precision in control.

Moreover, in the case where the orifice edges, i.e., the inner edges of the end portions of the cylindrical holes 10, 11 and the outer edges of the end portions of the sleeves 14, 15 and the plugs 16, 17 are worn due to a long service life, or in the case where the orifice edges are partially damaged due to the entrainment of foreign matters, the worn or damaged part is removed by again grinding the end faces of the valve body 1 and the casing 2, 3, and then the thickness of the spacer 4 is again adjusted so that the thickness of the spacer 4 is larger than the axial thickness of the valve body 1 by the predetermined difference. Thus, the valve portion may be restored the performance level substantially equal to that of a new valve. It is therefore possible to readily reuse the valve portion.

Figure 6:
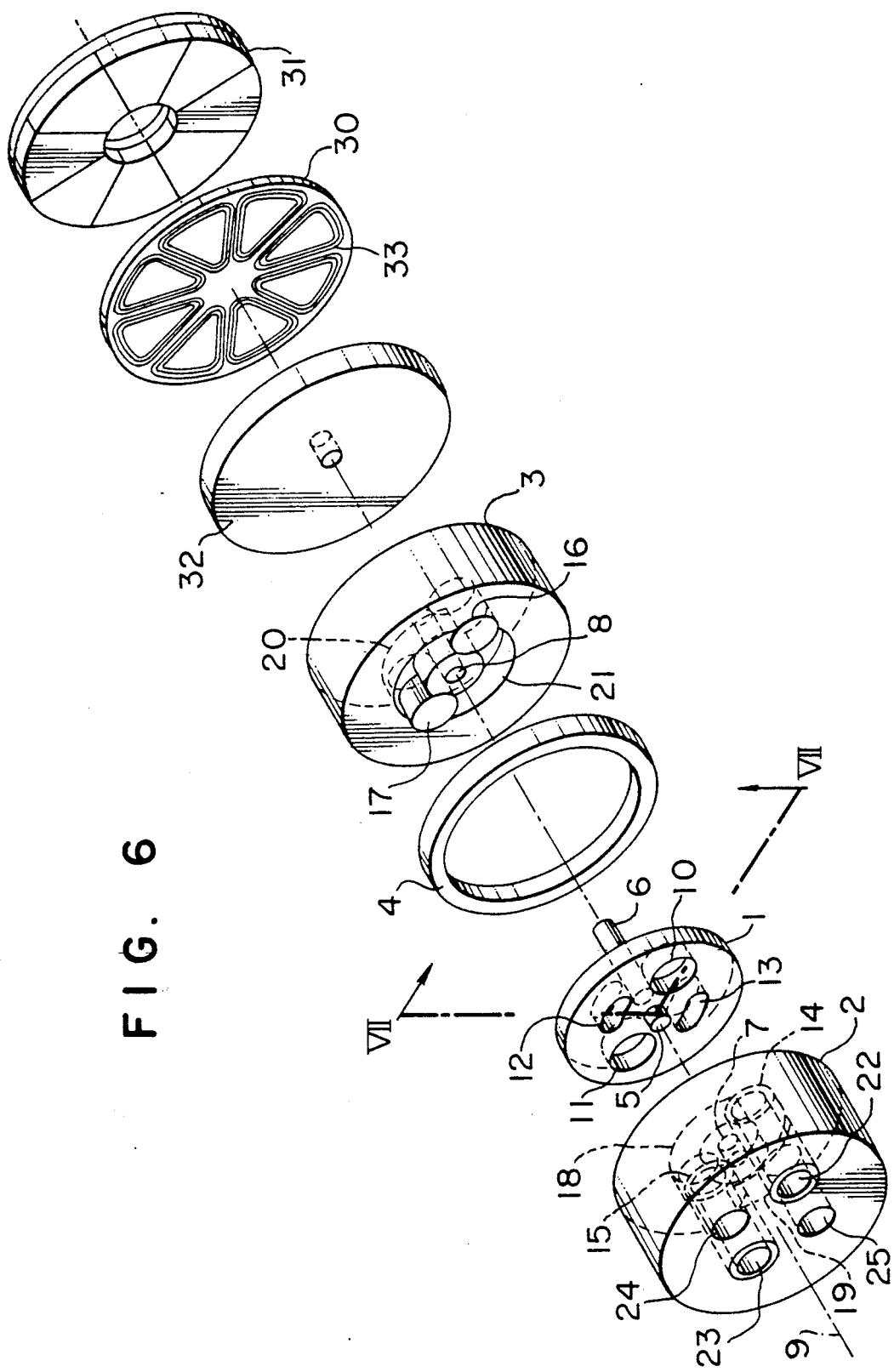
FIG. 6 is an exploded perspective view showing a four-way valve including a drive means in accordance with another embodiment of the invention.
Figure 7:
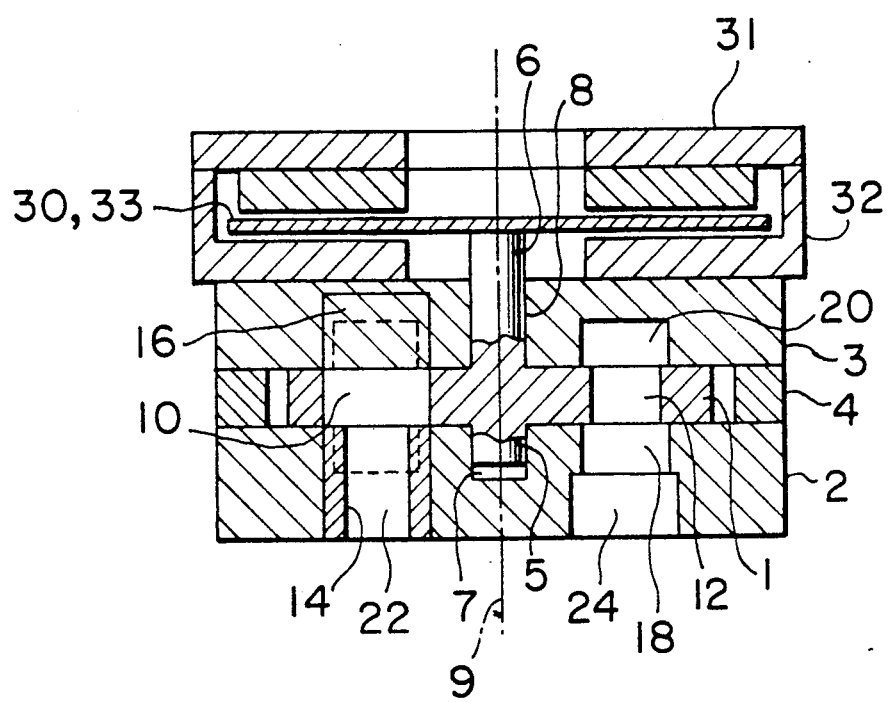
FIG. 7 is a sectional view taken along the line VII—VII of FIG. 6.
Figure 8:
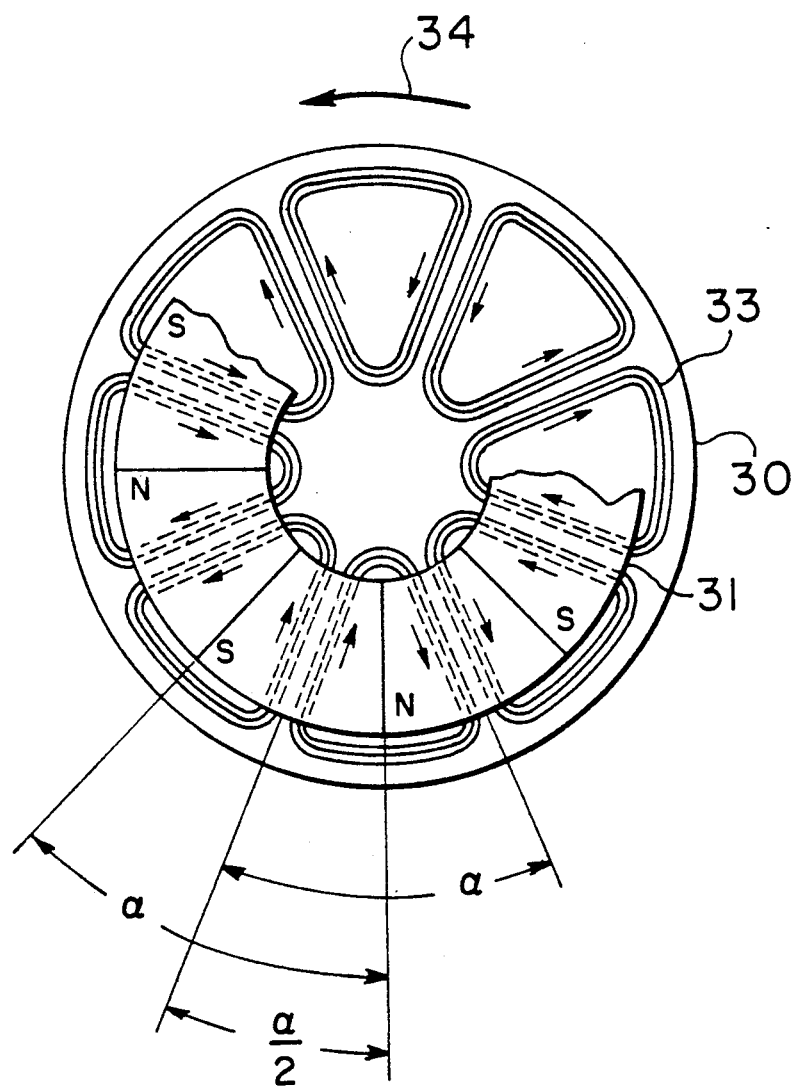
FIG. 8 is a plan view showing a structure of the drive means shown in FIG. 6.

In the embodiment of FIG. 6–8, a disc-shaped rotator 30 is connected integrally with the shaft 6 of the valve body 1, with the rotator 30 being clamped between a magnet 31 having a circular flat surface and yoke 32 to be rotatable at a predetermined space. The magnet 31 and the yoke 32 are fixed to the casing 3, and a plurality of coils 33 are arranged circumferentially on the rotator 30 so that their widing directions are alternatively changed by every $\alpha$ degrees. Also, the polarity of each of the poles of the magnet 31 is changed by every $\alpha$ degrees in the circumferential direction. Then, in the neutral condition of the valve portion, the borders of adjacent cores 33 and the border of the adjacent poles of the magnet 31 are offset from each other by an angle of $\alpha/2$.

Therefore, if the current flows in the coils 33 on the rotator 30 in the direction indicated by the arrows in FIG. 8 under the neutral condition of the valve, then an electromagnetic force will be generated according to Fleming's left-hand rule. Due to the above-described arrangement, all the magnetic force is used to the moment in the same direction. As a result, the rotator 30 and the valve body 1 coupled in unison with the rotator 30 are rotated in the direction indicated by the arrow 34, so that the valve portion is held in the condition shown in FIGS. 4 and 5. Also, if the current flows through the coils 33 in the direction opposite to the direction indicated by the arrow in FIG. 8, the rotator 30 and the valve body 1 are rotated in the direction opposite to the direction indicated by the arrow 34. Accordingly, it is possible to adjust the angular shift of the valve body 1 in accordance with the direction of the magnitude of the current flowing through the coils 33 on the rotator 30, and to control the flow rate and the direction of fluid in proportion to this adjustment.

According to the embodiment, of FIG. 6–8 since the rotator 30 is in the form of a disc, it is possible to particularly reduce a thickness of the drive means. Also, since the inertial moment of the valve body 1 is small as described above, the output of the drive means may be small to thereby make the rotator 30 small in size. Therefore, it is possible to ensure a high response time with a small drive force and the valve as a whole may be made small in size and light in weight. In addition, the comsumption energy and the heat generation of the drive means may be reduced.

Also, it is possible to modify the embodiment so that the plugs 16 and 17 provided in the casing 3 are replaced by the sleeves, or that the respective poles of the magnet 31 are in the form of a trapezoids to form an overall polygonal shape or the respective poles may be independent and separate ones in the circular or polygonal forms. Thus, it is possible further facilitate the manufacture of the coils.

Figure 9:
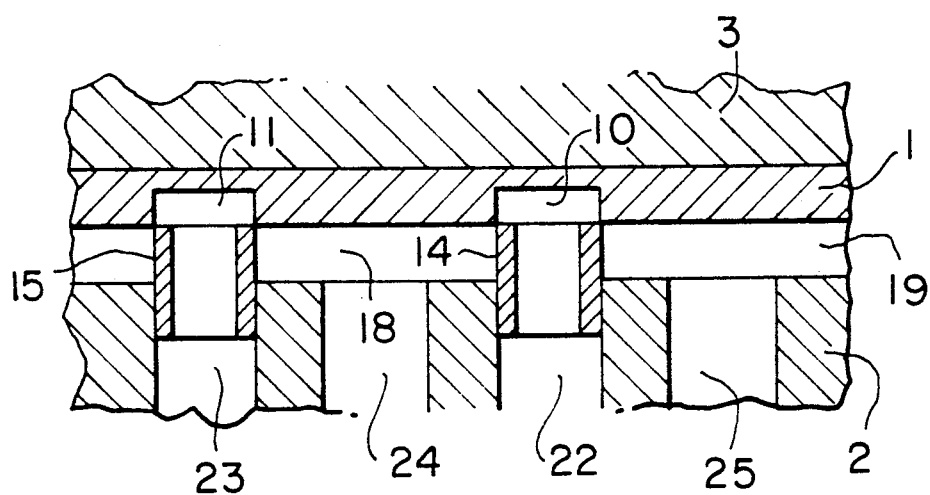
FIG. 9 is a developed sectional view showing a modification of the valve portion.

Also, as shown in FIG. 9, the valve portion may be composed only of the valve body 1 and the casing 2. In this case, the plugs 16 and 17 formed in the casing 3 and the flow paths formed therein may be dispensed with. Incidentally, in this case, the cylindrical holes 10 and 11 may be through-holes in the axial direction thereby further facilitating manufacturing of the valve.

Figure 10:
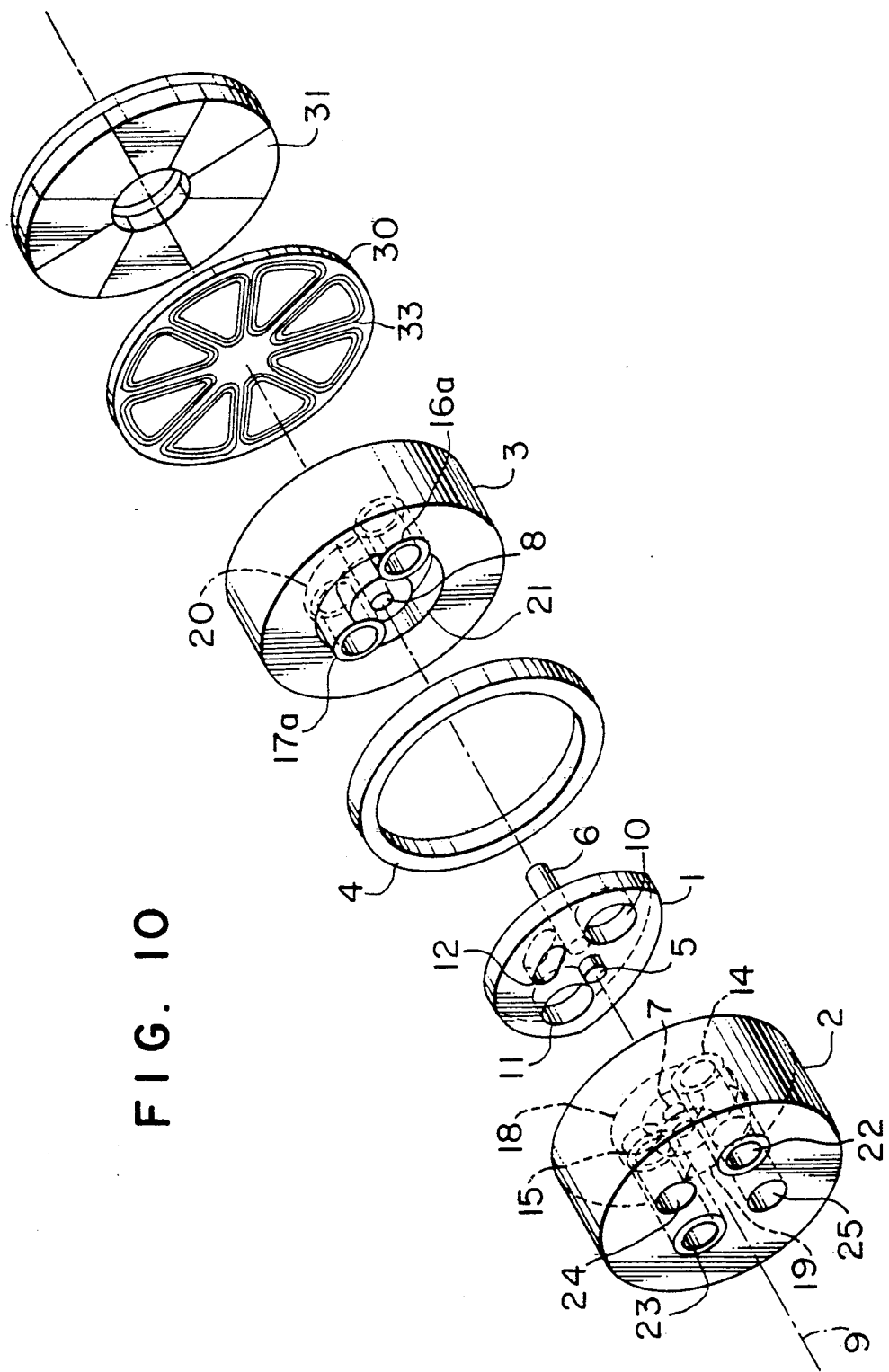
FIG. 10 is an exploded perspective view showing a modification of the embodiment shown in FIG. 6.

FIG. 10 shows a modification of the embodiment shown in FIGS. 6 through 8, wherein sleeves 16a and 17a are used instead of the plugs 16 and 17. In addition, the valve body 1 is modified in configuration so that the part of the valve body 1 confronting with the flow paths 19 and 21 in communication with the discharge port 25 is removed, and the valve body 1 may cover the flow paths 18 and 20 in communication with the supply port 24, the sleeves 14, 15 and the sleeves 16a, 17a and the cylindrical holes 10 and 11. Also, the yoke 32 is dispensed with, and the casing 3 may serve as the function of the yoke.

According to the embodiment of FIG. 10, since the valve body 1 is made smaller the inertial moment is further reduced. Also, the sliding area between the casings 2 and 3 and the valve body 1 is further reduced, so that a higher response time may be ensured even with further smaller drive force. Also, since the through hole portion 13 on the discharge port side may be dispensed with, it is easier to manufacture the valve body 1. Furthermore, since the yoke is dispensed with, the assembling work or maintenance work are more readily performed as well as the manufacture work.

Incidentally, since the yoke of the magnetic circuit is different from the casing in use or object, it is generally preferable to use different materials. However it has been experimentally determined that there is no practical problem at all even if the casing serves as the yoke since the casing is designed to have a mechanical strength enough to be durable against the high pressure, and the magnetic flow paths through which the magnetic flux may readily pass are inherently provided and the magnetic field is static.

Figure 11:
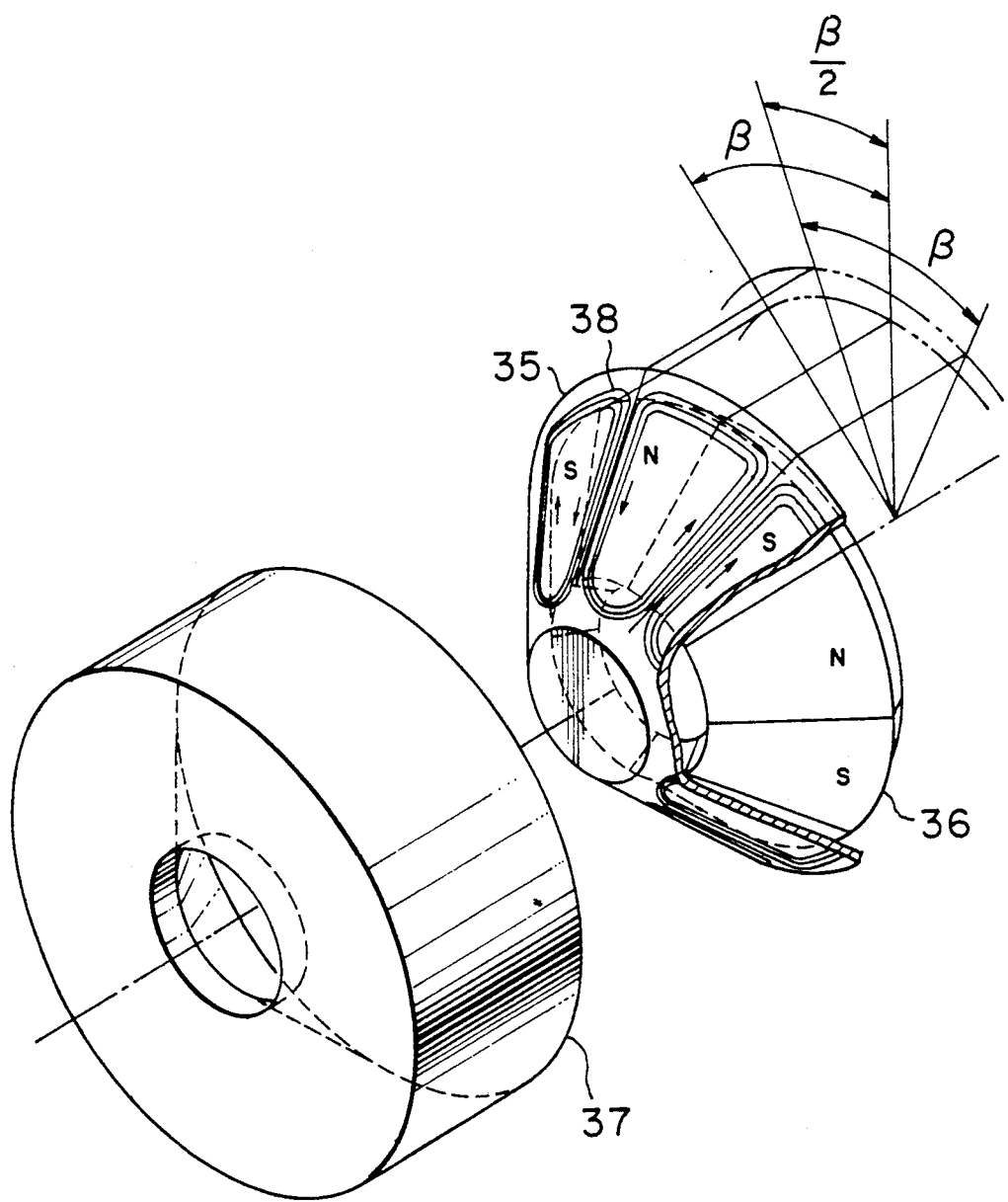
FIG. 11 is an exploded perspective view showing a drive means in accordance with another embodiment.

As shown in FIG. 11, a rotator 35 coupled in unison with the valve body has a conical shape, with, a magnet 36 and a surface, on the rotator 35 side, of a yoke 37 being conically formed. The rotator 35 is clamped between the magnet 36 and the yoke 37 to be rotatable at a predetermined space. The rotator 35 has a plurality of coils 38 that are switched over alternatively in their winding direction by an angle $\beta$ in the circumferential direction. Also, the polarities of the magnet 36 are alternatively switched over by every angle $\beta$ in the circumferential direction. Under the neutral condition, the borders of the respective coil 38 and the borders of the respective poles of the magnet 36 are offset from each other by an angle $\beta/2$.

Accordingly, it is possible to control the flow rate of fluid by adjusting the angular shift of the valve body 1 in accordance with the direction and the magnitude of the current flowing the coils 38 in the same manner as in the embodiment shown in FIGS. 6 through, 8.

According to the embodiment of FIG. 11, since the drive force may be increased by increasing the axial length of the rotator 35 even if the radial dimension of the rotator 35 is kept constant, it is possible to provide a rotator having a large drive force and a small inertial moment by selecting the combination of the radial and axial dimensions at an optimum condition. It is therefore possible to reduce the necessary drive force and to ensure a higher response time with a smaller energy.

Also, since the rotator 35 is conical, the drive means is superior also in mechanical strength, may withstand a higher drive force transmission, and is superior in vibration-resistance property. It is therefore possible to ensure higher reliability.

Figure 12:
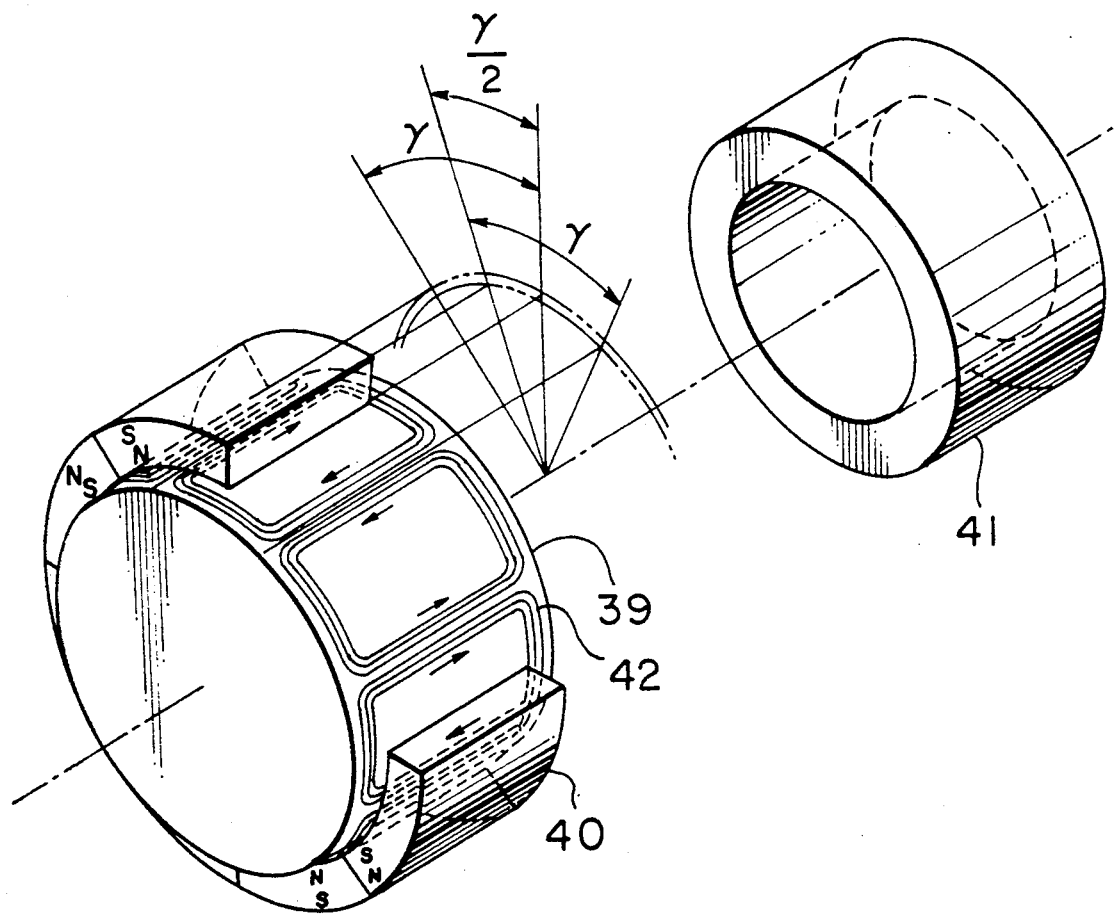
FIG. 12 is an exploded perspective view showing a drive means in accordance with still another embodiment.
Figure 13:
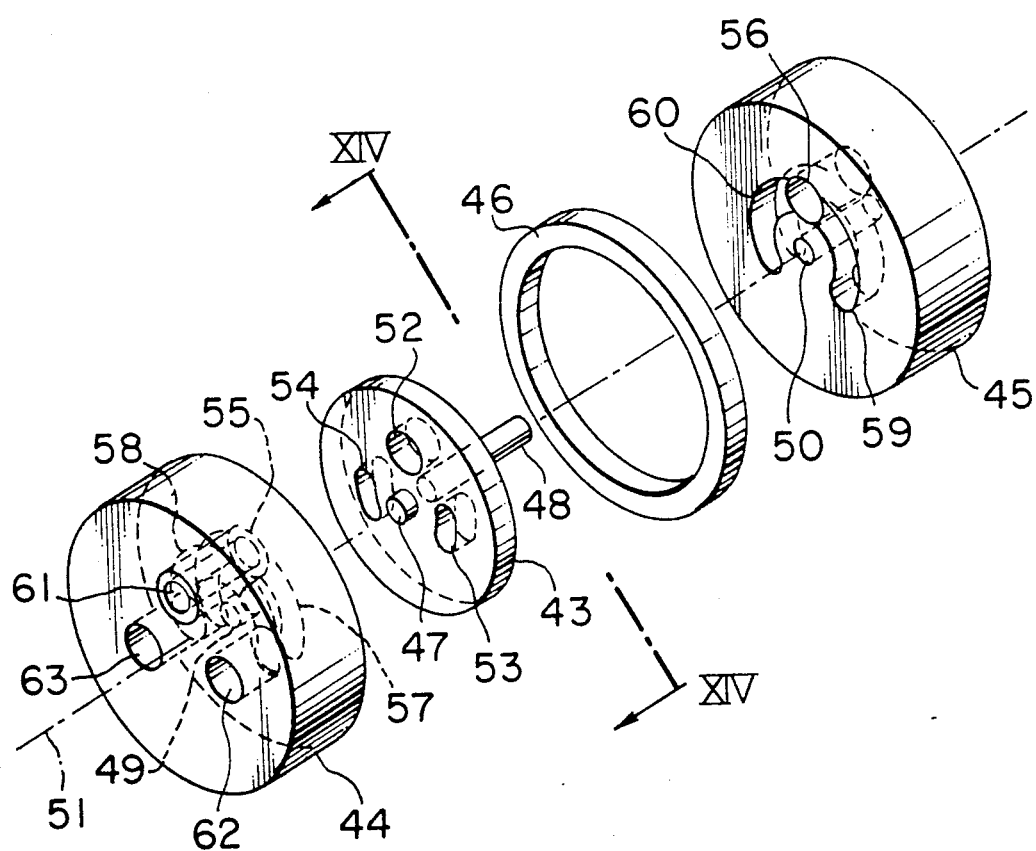
FIG. 13 is an exploded perspective view showing a three-way valve in accordance with another embodiment of the invention.

As shown in FIG. 12, rotator 39 connected in unison with the valve body is in the form of a cylinder, with a magnet 40 and a surface, on the rotator 39 side, of a yoke 41 being in the form of cylinders. The rotator 39 is clamped between the magnet 40 and the yoke 41 to be rotatable at a predetermined space. The rotator 39 has a plurality of coils 42 whose winding directions are alternatively changed by every angle $\gamma$ in the circumferential direction. Also, the polarities of the magnet 40 are alternatively changed by every angle $\gamma$ in the circumferential direction. Under the neutral condition, the borders of the respective poles of the magnet 40 and the borders of the respective poles of the coils 42 are offset from each other by every angle $\gamma/2$.

Therefore, it is possible to control the flow rate of fluid by adjusting the angular shift of the valve body 1 in accordance with the direction and the magnitude of the current flowing through the coils 42 in the same manner as in the embodiment shown in FIGS. 6 through 8.

According to the embodiment, of FIG. 12 since the radial directional dimension of the rotator 39 is kept constant, the drive force is increased in proportion to the axial length thereof, it is possible to provide a rotator 39 which has a large drive force and a small inertial moment by selecting a combination of the radial and axial dimensions at an optimum level. It is therefore possible to further reduce the necessary drive force and to obtain a higher response time even with a smaller energy supply.

Also, since the rotator 39 is cylindrical, it is superior in mechanical strength and also in vibration resistant property while being durable against further large drive force. It is therefore possible to ensure higher reliability.

The three-way valve of FIGS. 13–17 includes a valve body 43 clamped by a casing 44 and a casing 45 together with a spacer 46. A thickness of the spacer 46 is larger than an axial thickness of the valve body 43 by a predetermined thickness difference. Also, shafts 47 and 48 are extended from end faces of the valve body 43 to form a radial bearing between axial holes 49 and 50 formed in the casing 44 and 45. Accordingly, the valve body 43 is rotatable about a rotational center axis 51 relative to the casings 44 and 45 and the spacer 46.

A cylindrical hole 52, parallel with the rotational center axis 51, and through hole portions 53 and 54 are formed in the valve body 43. On the other hand, the casing 44 and 45 have a sleeve 55 and a plug 56 which have an outer diameter substantially equal to an inner diameter of the cylindrical hole 52 formed in the valve body 43, and flow paths 57, 58 and 59, 60 formed so as to be separated from each other by the sleeve 55 and the plug 56. In the casing 44, a control port 61 is in communication with an inner diameter portion of the sleeve 55, a supply port 62 is in communication with a flow path 57, and a discharge port 63 is in communication with a flow path 58.

Figure 14:
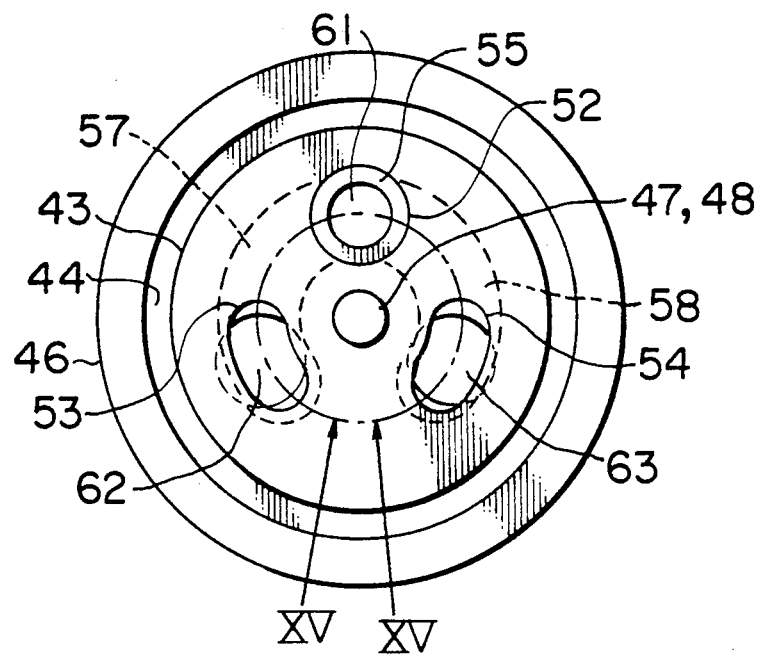
FIG. 14 is a view, as viewed from the position XIV—XIV of FIG. 13, showing a neutral position.
Figure 15:
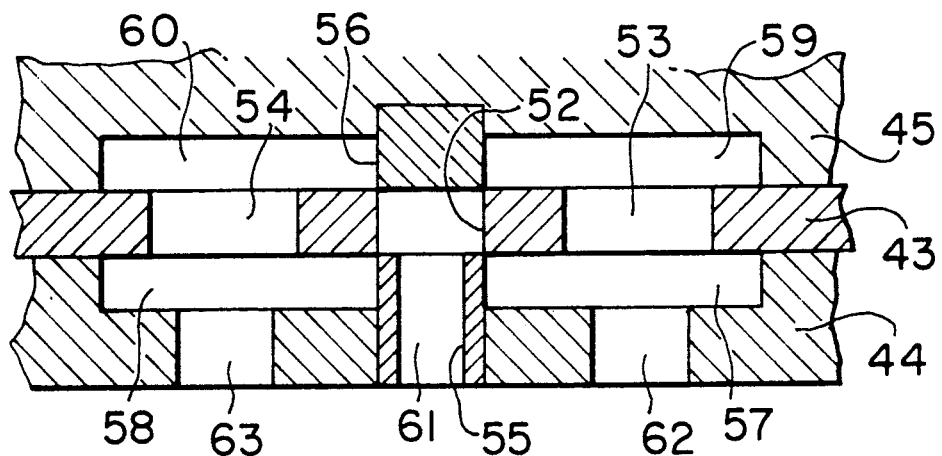
FIG. 15 is a developed sectional view taken along the line XV—XV of FIG. 14.

In the neutral condition of FIGS. 14 and 15 since the inner edge is in alignment with the outer edges of the sleeve 55 and the plug 56, the control port 61 is blocked from the supply port 62 and the discharge port 63, thus blocking the flow of the fluid.

Figure 16:
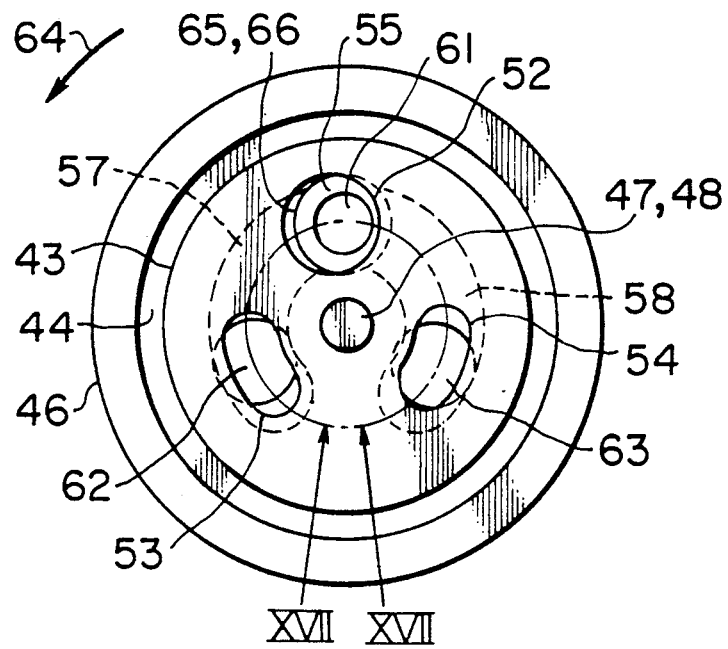
FIG. 16 is a view, as viewed from the position XIV—XIV of FIG. 13, showing an opening condition.
Figure 17:
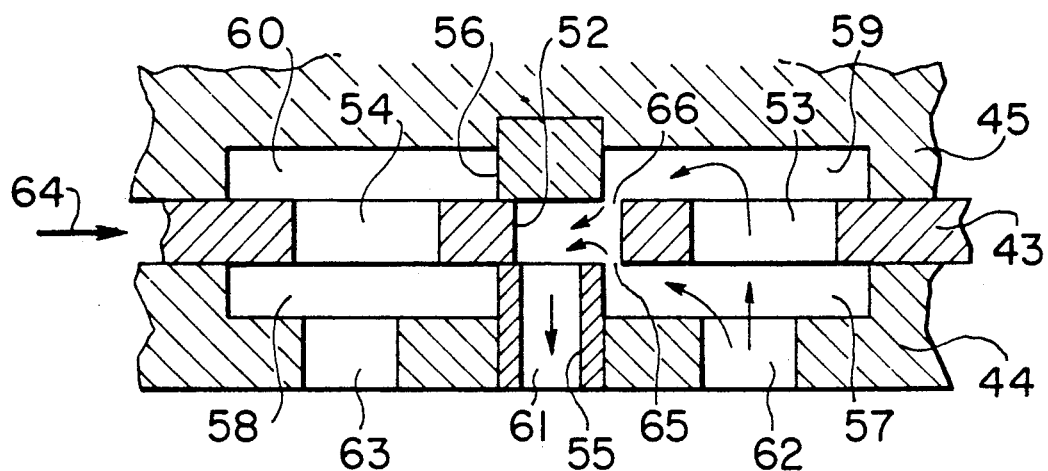
FIG. 17 is a developed sectional view taken along the line XVII—XVII of FIG. 16.

Upon rotating the valve body 43 in the direction indicated by the arrow 64 to the position shown in FIGS. 16 and 17, the valve body 43 opens portions 65 and 66 surrounded by the inner edges of the cylindrical hole 52, the outer edges of the sleeve 55 and the plug 56, and the inner and outer edges of the flow paths 57 and 59 will appear to serve as control orifices. Therefore, the control port 61 is in communication with the supply port 62 through the control orifices 65 and 66, so that the fluid will flow from the supply port 62 to the control port 61 as indicated by the arrows in FIG. 17. Also, if the rotary valve 43 is rotated in the direction opposite to the direction indicated by the arrow 64, the control port 61 is in communication with the discharge port 63, so that the fluid will flow from the control port 61 to the discharge port 63. Then, the opening areas of the control orifices 65, 66 are in proportion to the angular shift of the valve 43, and the flow rate is determined in proportion to the opening area. Thus, the valve serves as a forward and reverse rotational type, stepless, continuous variable three-way valve.

The construction of the embodiment of FIGS. 13–17 is such that the magnitude of the flow path cross sectional area does not directly affect the size of the,, valve body 43 since the sleeve 55, the plug 56 and the flow paths 57, 58 and 59, 60 are formed on the casing side in the same manner as in the embodiment of the four-way valve of FIGS. 2 and 3. Also, since the structure of the valve body 43 is simple and the stress concentration and deformation would be unlikely to be produced, it is unnecessary to impart an excessive dimensional size to the valve body 43 for the mechanical strength. The valve body 43 may be made small in size and light in weight. Also, it is possible to reduce the consumption energy and the heat generation in the drive means. Furthermore, since the high pressure part extending from the supply port 62 and terminating at the control port 61 is suppressed at a necessary minimum level, the valve portion per se may be made small in size and light in weight.

During the manufacture of the valve portion, it is sufficient to simultaneously machine the cylindrical hole 52 of the valve body 43 and the holes of the casings 44 and 45 on which the sleeve 55 and the plug 56 are to be mounted, and then to mount the sleeve 55 and the plug 56 on the valve body 43. Also, the adjustment of the lap amount may be performed by adjusting the difference in dimension between the inner diameter of the cylindrical hole and the outer diameter of the sleeve and the plug at a predetermined level during the machining work. Accordingly, it is easy to manufacture the valve portion and to reduce the number of manufacture steps. In addition, a high accuracy may be ensured even in control.

In addition, in the case where the edges of the control orifices 65, 66, i.e., the inner edges of the end portion of the cylindrical hole 52 and the outer edges of the sleeve 55 and the plug 56 are worn due to a long service life, or in the case where the orifice edges are partially damaged due to the entrainment of foreign matter, the damaged or worn portion is removed by again grinding the end faces of the valve body 43 and the casings 44 and 45, and by adjusting the orifice edges so that the thickness of the spacer 46 is again larger than the axial thickness of the valve body 43 by the predetermined thickness difference. Thus, since the valve portion may restore the function substantially equal to that of a new one, so that the valve portion may readily be reused.

Figure 18:
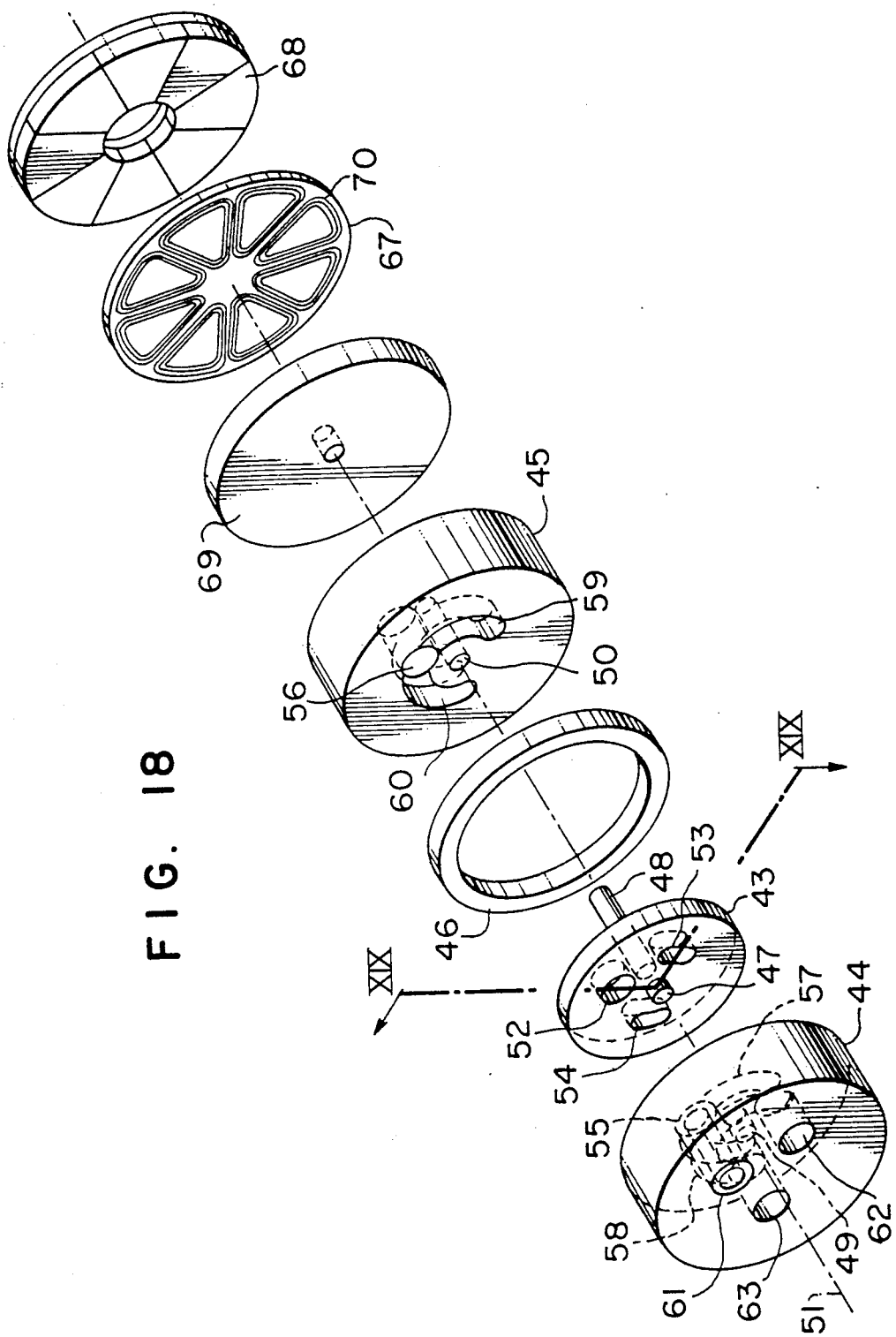
FIG. 18 is an exploded perspective view showing a three-way valve including a drive means in accordance with another embodiment.
Figure 19:
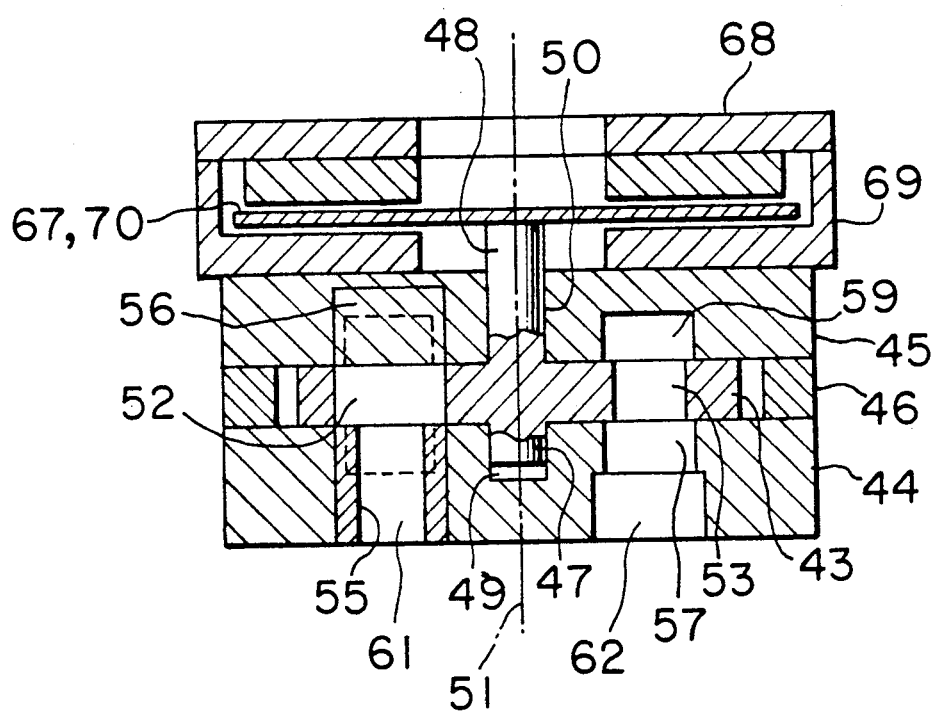
FIG. 19 is a developed sectional view taken along the line XIX—XIX of FIG. 18, showing an assembled state.

The embodiment of FIGS. 18 and 19 includes a valve body composed of the valve portion of the three-way valve shown in FIGS. 13 through 17 and the drive means having the disc-shaped rotator, with the operation and the structure of the valve body is the same as that of the foregoing embodiment.

A shaft 48 of the valve body 43 is fixedly coupled fixedly to a disc-shaped a rotator 67 clamped between the magnet 68 and the yoke 69 having circular flat surfaces so as to be rotatable at a predetermined space, and the magnet 68 and the yoke 69 are fixedly secured to the casing 59. A plurality coils 70 are provided on the rotator 67 so that their winding directions are alternatively changed by every angle α in the circumferential direction. The polarities of the respective poles of the magnet 68 are alternatively changed by every angle α in the circumferential direction. The rotator 67 is coupled to the valve body 43 so that the borders of the respective coils 70 and the borders of the respective poles of the magnet 68 are offset from each other by an angle of α/2.

Accordingly, it is possible to control the direction and flow rate of the fluid, by adjusting the angular shift of the valve body 43 in accordance with the direction and the magnitude of the current flowing through the coils 70 on the rotator 67 in the same manner as in the embodiment shown in FIGS. 6 through 8.

According to this embodiment, since the rotator 61 is in the form of a disc, it is possible to reduce a thickness of the drive means, and also, since the inertia moment of the valve body 43 is small it is possible to reduce the rotator 61 due to the fact that the output of the drive means may be reduced. Accordingly, it is possible to make the valve body 43 as a whole small in size and light in weight, it is possible to ensure a high response time with a small drive force. It is also possible to reduce the consumption energy and the heat generation of the drive, means.

In the embodiment of FIGS. 18 and 19, it is possible to replace the plug 56 provided in the casing 45 by the sleeve. With respect to the magnet 68, it is possible to modify it so that the respective poles of the magnet as a whole may be polygonal or the respective poles may be separate and independent circular to polygonal ones. Thus, it is possible to more facilitate the manufacture.

Furthermore, in the case of the three-way valve the valve arrangement may be composed solely of the valve body 43 and the casing 44 in the same manner as in the embodiment shown in FIG. 9. Thus, it is much easier to manufacture the valve portion.

Figure 20:
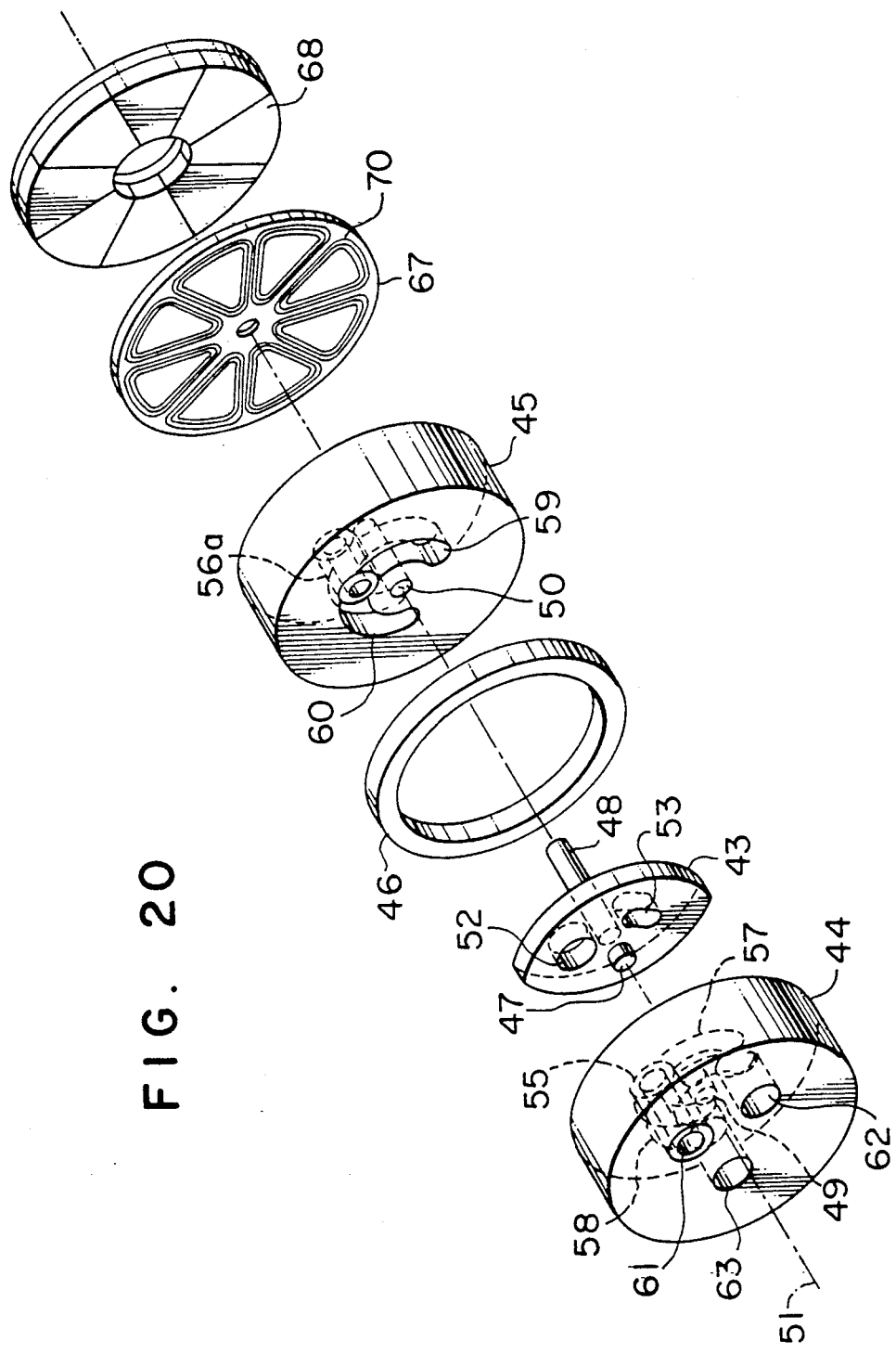
FIG. 20 is an exploded perspective view showing a modification of the embodiment shown in FIG. 18.

In the embodiment of FIG. 20, a sleeve 56a is provided instead of the plug 56 shown in the embodiment of FIGS. 18 and 19. THe valve body 43 is modified in configuration so that the part, confronting with the flow paths 58 and 60 in communication with the discharge port 63, of the valve body 43 is removed, and the valve body 43 may cover the flow paths 57 and 59 in communication with the supply port 62, the sleeve 55 and the sleeve 56a in communication with the control port 61. Also, the yoke 69 is dispensed with, and the casing 45 may serve the function of the yoke 69.

According to the embodiment, of FIG. 20 since the valve body 43 is small in size and light in weight, the inertial moment is further reduced. Since the sliding surface area between the valve body 43 and the casings 44 and 45 is small, it is possible to ensure a higher response time with a further smaller drive force. Also, since it is possible to dispense with the through hole portion 54 on the discharge port side, it is much easier to manufacture the valve body 43. Furthermore, since the yoke 69 is also dispensed with, the assembling work and maintenance work may readily be performed as well as the manufacture work.

Figure 21:
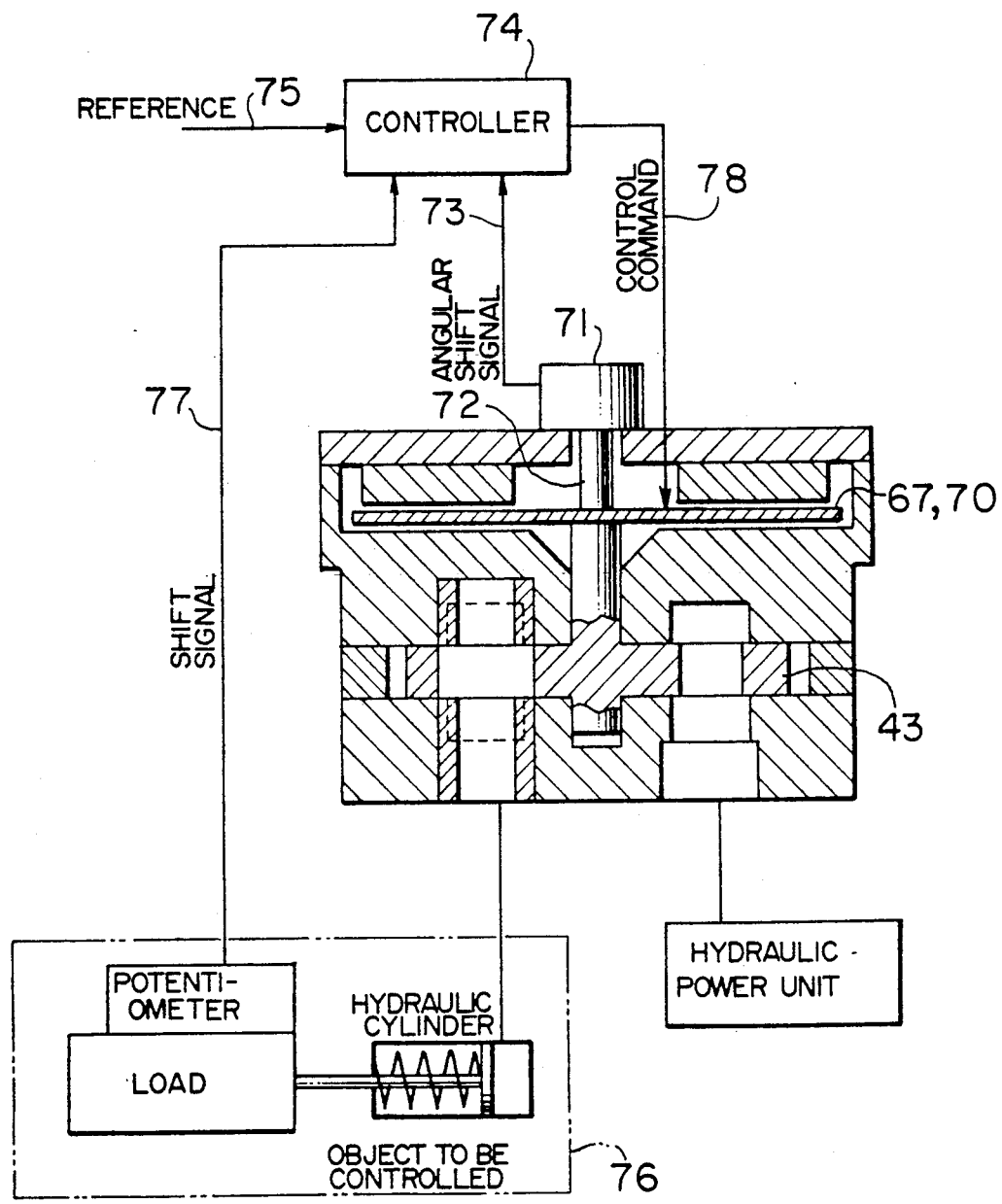
FIG. 21 is a sectional view showing one embodiment of a direct drive type rotary servo valve using a rotary valve according to the invention.

FIG. 21 shows an embodiment of a direct drive type rotary servo valve system using a rotary valve in accordance with the invention.

In the direct drive rotary valve system of the of FIG. 21 an angular shift detector 71 is provided for detecting the angular shift of the valve body 43 and the rotator 67. A shaft 72 of the angular shift detector 71 is connected to the valve body 43 and the rotator 67 and is rotated together therewith. When the valve body 43 is rotated by the electromagnetic force generated on the rotator 67, an angular shift signal 73 detected by the angular shift detector 71 is fed back into a controller 74 where this value is compared with a shift signal 77 of an object 76 to be controlled and a reference value 75. The difference therebetween is amplified to form a control command signal 78 which is given to the coils 70 on the rotator 67, thus forming a positional servo system.

According to this embodiment, it is possible to ensure the effect of the above-described embodiments, and in particular, since the inertial moment of the rotational parts is small, it is possible to enhance an inherent value of the servo valve. In addition, since it is possible to facilitate the electric adjustment of the characteristics which are most suitable for the use condition by adjusting each gain, it is possible to obtain a frequency characteristic that is high and stable. Also, since the consumption energy is small, the heat generation of the drive means is small, and the power amplifying performance of the controller is small, it is possible to make the controller small in size.

Figure 22:
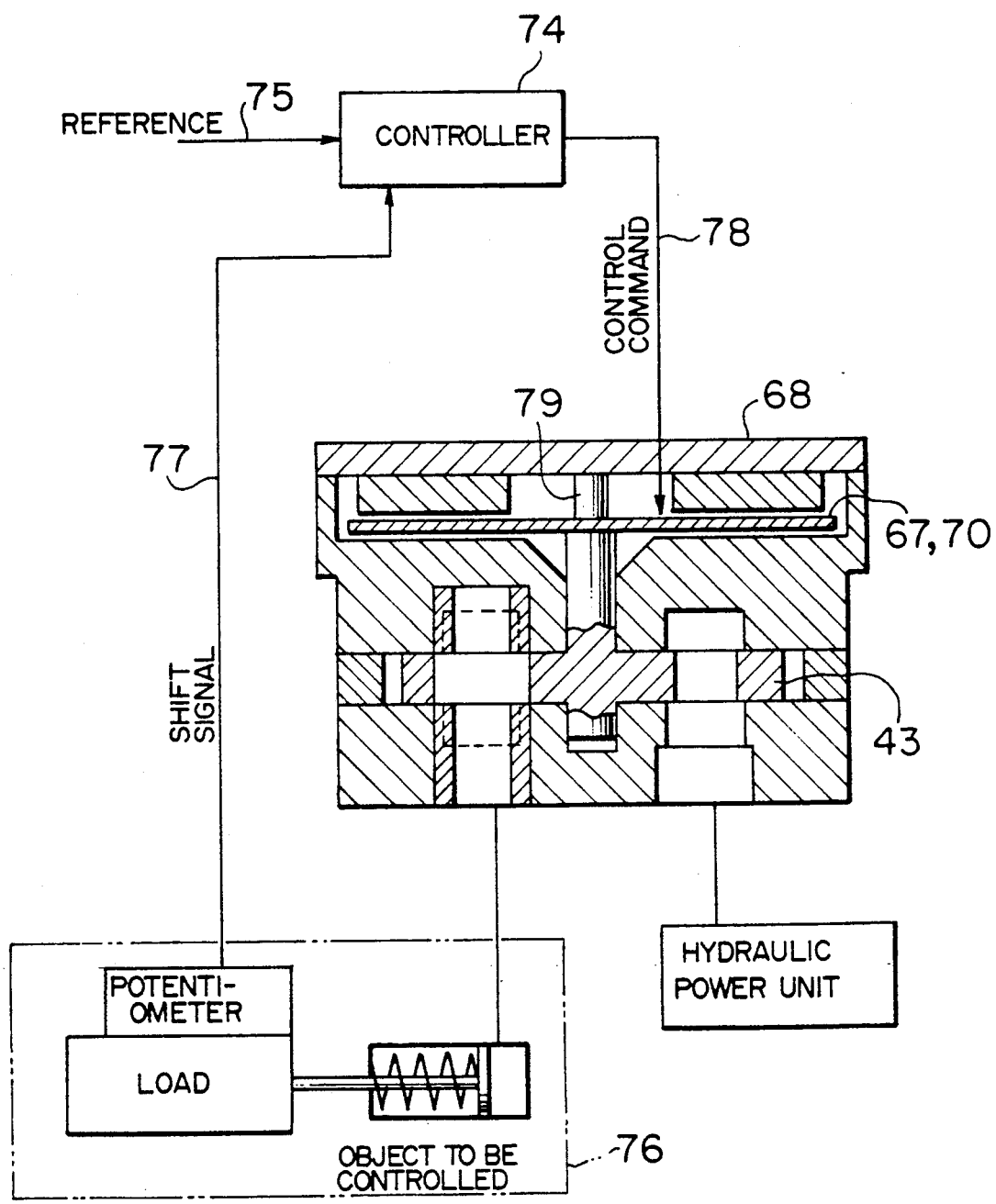
FIG. 22 is a sectional view showing another embodiment of a direct drive type rotary serve valve using a rotary valve according to the invention.

In the direct drive type rotary servo valve system of the embodiment of FIG. 22, a torsion spring 79 is provided on the shafts of the valve body 43 and the rotator 67. The torsion spring 79 is connected at one end to the valve body 43 and the rotator 67, and at the other end to the magnet 68.

Accordingly, when the valve body 43 and the rotator 67 are rotated, a twisting moment against the rotation will be generated in the torsion spring 79. The valve body 43 and, the rotator 67 are stopped at the position where the twisting moment is balanced with the moment of the drive force generated on the rotator 67, thus determining the flow rate of fluid. In the controller 74, the reference value 75 and the shift signal 77 of the object 76 to be controlled are compared with each other to amplify the deviation therebetween and to impart the deviation to the coils 70 on the rotator 67 to form a positional serve system.

Also, according to the embodiment of FIG. 22, the same effects inherent to the above-described embodiments may be obtained and the inertia of the rotational parts is small. It is therefore possible to readily increase the inherent value of the servo valve even with a soft spring. It is possible to obtain a high and stable frequency characteristic with a small drive force. Accordingly, since the consumption energy is small, the heat generation from the drive means is small. Since the power amplifying ability of the controller may be small, it is possible to make the controller small in size. Also, since a torsion spring 79 is used, in the case of a rubber spring, for example, a Poisson ratio effect is small and unlike a tension or compression spring, a hysterisis is small, so that it is possible to ensure a higher control precision.

Figure 23:
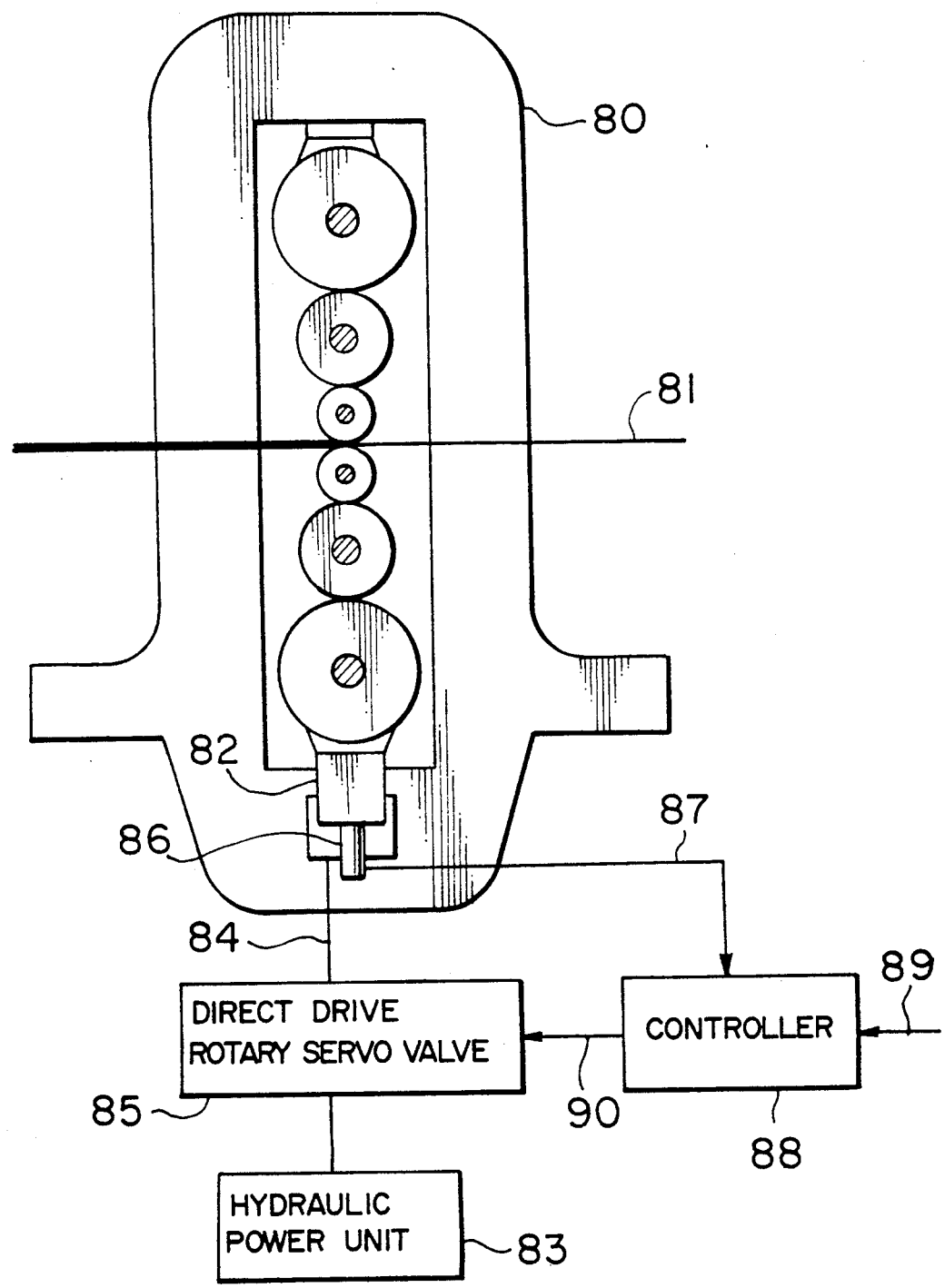
FIG. 23 is a view showing one embodiment of a hydraulic pressure control apparatus for a rolling mill in which the lenear rotary servo valve is used according to the invention.

In the embodiment of FIG. 23, the direct drive type rotary servo valve of the present invention may be employed in a hydraulic control unit for a rolling machine 80 comprising a hydraulic cylinder 82 used as a pressure means for imparting a rolling load to a material 81 to be rolled, and a direct drive type rotary servo valve 85 disposed in a midportion of a pipe 84 for supplying a high pressure fluid from a hydraulic power unit 83 to the hydraulic cylinder 82. Also, a shift detector 86 is provided in the hydraulic cylinder 86, a shift signal 87 detected by the shift detector 86 is fed back to a controller 88. Then, in the controller 88, the shift signal 87 and a reference value 89 are compared with each other, to amplify the deviation therebetween and to impart a command signal 90 to the direct drive type rotary servo valve 85.

Accordingly, according to the embodiment of FIG. 23, since the direct drive type rotary servo valve 85 may readily be manufactured with a high precision in control, it is possible to exactly control a thickness of a discharged plate material of the rolled material 81. Therefore, it is possible to provide a good rolled product in a stable manner at all the times inspite of changes of various parameters. Also, since the direct drive type rotary servo valve 85 may ensure a high response time with a small drive force, the power amplifying ability of the controller 88 may be small, the controller 88 may be made small in size and the consumption energy or the heat generation may be reduced.

Figure 24:
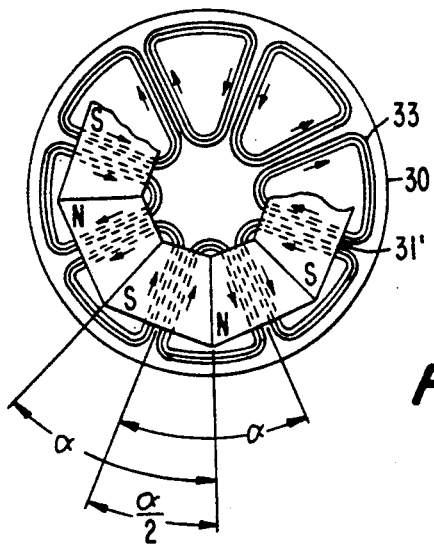
FIG. 24 is a plan view of another embodiment of a drive means constructed in accordance with the present invention.

In the embodiment of FIG. 24, a magnet 31' is provided which has a polygonal flat face; however, in all other respects, the drive of FIG. 24 is similar to that of FIG. 8.

Figure 25:
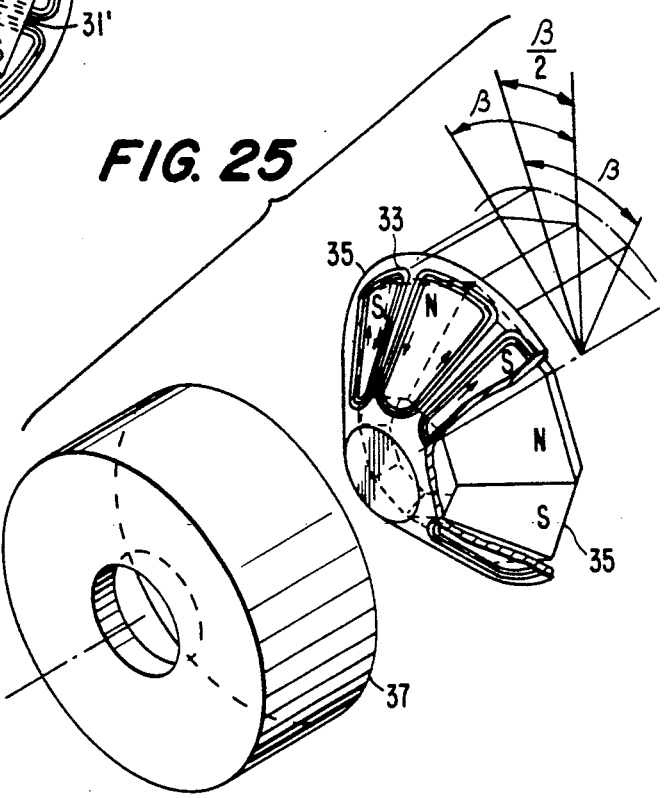
FIG. 25 is an exploded perspective view showing still another embodiment of a drive means in accordance with the present invention.
Figure 26:
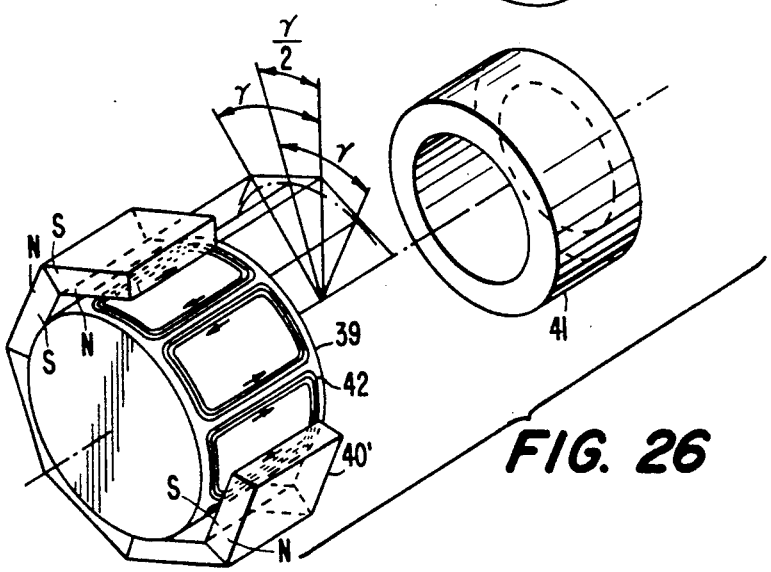
FIG. 26 is an exploded perspective view of a still further drive means constructed in accordance with the present invention.

The drive means of the embodiment of FIG. 25 is similar to that of FIG. 11; however, a magnet 36' is provided which has a polygonal conical surface.

In view 26 yet another embodiment of a drive means is provided which is similar to FIG. 12 but which includes a magnet 40' having a polygonal tubular surface.

As described above, according to the rotary valve of the invention, the parts which are disposed at high pressure are reduced to a minimum possible level, the structure of the valve body is simple and the thickness of the valve body may be reduced, the valve portion may be made small in size and light in weight. In addition, during the manufacture of the valve portion, it is possible to perform the simultaneous machining, and it is easy to adjust the lap amount and the clearance. It is possible to ensure the easy manufacture and the high precision manufacture. Therefore, it is easy to reduce the number of the manufacture steps and to reduce the cost of the manufacture.

Also, since the valve body is made small with a small inertial moment, it is possible to ensure a high response time with a small drive force. Therefore, the small drive means may be used. Thus, the consumption energy and the heat generation in the drive means may be reduced.

Moreover, in the case where the control orifice edges are worn due to the long service life, it is possible to restore the original performance by reusing the valve portion.

Accordingly, if the rotary valve according to the invention is applicable to the direct drive type rotary servo valve, it is possible to make the valve small in size and light in weight with a high control precision. It is further possible to enhance the inherent value of the servo valve, and to readily ensure the high responsibility. Therefore, it is possible to make the controller as well as the servo valve smaller in size, and the consumption energy and heat generation of the system may be reduced. The cost or running cost of the system as a whole may be reduced to offer an economical advantage.

Accordingly, if the direct drive type rotary servo valve according to the invention is applied to a hydraulic controller for a rolling machine, it is possible to provide a control system having a high precision and a high responsibility. It is possible to always keep the system under a good rolling condition. It is possible to obtain stable and good rolled projects. Accordingly, it is possible to enhance a quality and a yield of the rolled products.

Thus, according to he present invention, an economical advantage as well as the technical advantage may be ensured.

What is claimed is:

1. A rotary valve comprising valve body means, at least a pair of casing means rotatably clamping said valve body means from opposite sides thereof to cause a flow of fluid through the rotary valve to be controlled by relative motion between said valve body means and said casing means, said valve body means including at least one cylindrical hole means and at least one through hole means extending axially therethrough, one of said pair of casing means including at least one sleeve means for forming a control orifice in cooperation with said cylindrical hole means and a pair of flow paths formed to separated from each other by said sleeve means, a control port communicating with said sleeve means, a supply port and a discharge port respectively communicating with said pair of flow paths, the other of said pair of casing means including one of at least one sleeve means for forming another control orifice in cooperation with said cylindrical hole means and at least one plug means, the other of said pair of casing means further including a pair of flow paths formed to be separated from each other by said one of the sleeve means and the plug means of said other of said pair of casing means, one of said flow paths of said other of said pair of casing means being in communication with one of said flow paths of said one of said pair of casing means through said valve hole means, and drive means for driving said valve body means including a rotator means integrally formed with said valve body means, said drive means comprising a plurality of coil means having winding directions alternating in a circumferential direction, said rotator means includes a disk-shaped rotator coupled with a part of said valve body means, a magnet means having polarities alternating in the circumferential direction and which has one of a circular and polygonal flat face, and a yoke having one of a circular and polygonal flat face.

2. A rotary valve comprising valve body means, at least a pair of casing means for rotatably clamping said valve body from opposite sides thereof to cause a flow of fluid through the rotary valve to be controlled by relative motion between said valve body means and said casing means, said valve body means including at least one cylindrical hole means and at least one through hole means axially extending therethrough, one of said pair of casing means including at least one sleeve means for forming a control orifice in cooperation with said cylindrical hole means and a pair of flow paths formed to be separated from each other by said at least one sleeve means, a control port communicating with said at least one sleeve means, a supply port and a discharge port respectively communicating with said pair of flow paths, drive means for driving said valve body means including a rotator means integrally formed with said valve body means, an angular detector means for detecting an angular shift of said valve body and said rotator means so that an angular shift signal from said angular shift detector means is fed back to electrically position said valve body means and said rotator means, wherein the rotary valve is a direct drive rotary servo valve in which said valve body means is directly driven by said driving means, and wherein said valve body means is shaped so as to entirely cover one of said flow paths in communication with said at least one sleeve means and said supply port and a portion of the other of said flow paths in communication with said discharge port.

3. A rotary valve comprising valve body means, at least a pair of casing means for rotatably clamping said valve body from opposite sides thereof to cause a flow of fluid through the rotary valve to be controlled by relative motion between said valve body means and said casing means, said valve body means including at least one cylindrical hole means and at least one through hole means axially extending therethrough, one of said pair of casing means including at least one sleeve means for forming a control orifice in cooperation with said cylindrical hole means and a pair of flow paths formed to be separated from each other by said at least one sleeve means, a control port communicating with said at least one sleeve means, a supply port and a discharge port respectively communicating with said pair of flow paths, drive means for driving said valve body means including a rotator means integrally formed with said valve body means, a torsion spring means provided around shafts of said valve body means and said rotator means for positioning said valve body means and said rotator means, wherein the rotary valve is a direct drive rotary servo valve in which said valve body means is directly driven by said driving means, and wherein said valve body means is shaped so as to entirely cover one of said flow paths in communication with said at least one sleeve means and said supply port and a portion of the other of said flow paths in communication with said discharge port.

* * * * *